(12) United States Patent
Schneider et al.

(10) Patent No.: US 10,887,371 B2
(45) Date of Patent: Jan. 5, 2021

(54) SYSTEMS AND METHODS FOR CONTENT STORAGE AND RETRIEVAL

(71) Applicant: Google Inc., Mountain View, CA (US)

(72) Inventors: Brian Schneider, Brooklyn, NY (US); Nicholas Mark Vasic Cooper, Annandale (AU); Dongli Tu, Great Neck, NY (US)

(73) Assignee: Google LLC, Mountain View, CA (US)

( * ) Notice: Subject to any disclaimer, the term of this patent is extended or adjusted under 35 U.S.C. 154(b) by 452 days.

(21) Appl. No.: 14/853,214

(22) Filed: Sep. 14, 2015

(65) Prior Publication Data

US 2017/0078362 A1    Mar. 16, 2017

(51) Int. Cl.
*H04L 29/08*    (2006.01)
*G06F 16/13*    (2019.01)

(52) U.S. Cl.
CPC .............. *H04L 67/06* (2013.01); *G06F 16/13* (2019.01); *H04L 67/02* (2013.01)

(58) Field of Classification Search
CPC ..... H04L 67/06; H04L 67/02; H04L 63/0428; G06F 17/30091
See application file for complete search history.

(56) References Cited

U.S. PATENT DOCUMENTS

| | | | |
|---|---|---|---|
| 8,697,458 B2 | 4/2014 | Nolan et al. | |
| 8,911,060 B2 | 12/2014 | Drury | |
| 9,053,124 B1 * | 6/2015 | Dornquast | H04L 67/1072 |
| 9,596,794 B2 | 3/2017 | Stevens et al. | |
| 10,190,701 B2 | 1/2019 | Raj et al. | |
| 2003/0115295 A1 * | 6/2003 | Potts, Jr. | H04L 67/06 709/219 |
| 2012/0084405 A1 * | 4/2012 | McQuarrie | G06F 17/30011 709/219 |
| 2013/0305039 A1 * | 11/2013 | Gauda | G06F 21/6218 713/153 |

(Continued)

FOREIGN PATENT DOCUMENTS

| | | |
|---|---|---|
| JP | 2010-175849 | 12/2010 |
| JP | 2013-081158 | 5/2013 |

(Continued)

OTHER PUBLICATIONS

Pantos, R., and W. May. "HTTP Live Streaming draft-pantos-http-live-streaming-12." Apple Inc, IETF draft (Oct. 14, 2013).*

(Continued)

*Primary Examiner* — Caroline H Jahnige
(74) *Attorney, Agent, or Firm* — Lowenstein Sandler LLP

(57) ABSTRACT

Systems and methods are disclosed herein for accessing portions of a file at a client device. One or more portions of a file are selected for downloading to the client device, wherein the file is stored on a web-based storage system in communication with the client device via a network. At least one portion in the selected one or more portions is identified that is not stored on the client device. A request is transmitted, without user interaction, to the web-based storage system to download the identified at least one portion of the file, and the identified at least one portion of the file is downloaded to the client device via the network.

23 Claims, 6 Drawing Sheets

(56) References Cited

U.S. PATENT DOCUMENTS

| | | | | |
|---|---|---|---|---|
| 2013/0311775 A1* | 11/2013 | Nair | .................... | H04L 63/0428 713/167 |
| 2014/0281867 A1* | 9/2014 | Vogel | .................... | G06F 17/246 715/212 |
| 2014/0330874 A1* | 11/2014 | Novak | ................ | H04L 65/4069 707/827 |
| 2014/0365619 A1* | 12/2014 | Serlet | ................ | G06F 17/30067 709/219 |
| 2015/0200988 A1 | 7/2015 | Cabanillas et al. | | |
| 2017/0149860 A1* | 5/2017 | Ben Eli | ................. | H04L 65/607 |

FOREIGN PATENT DOCUMENTS

| | | |
|---|---|---|
| JP | 2014-203280 | 9/2014 |
| WO | 97-15699 A2 | 5/1997 |
| WO | 2014/206749 A1 | 12/2014 |
| WO | 2015/084890 A1 | 6/2015 |

OTHER PUBLICATIONS

PCT International Search Report and Written Opinion for International Application No. PCT/US20161049848, dated Nov. 10, 2016, 11 pages.
European Patent Application No. 16 763 691.9 Office Action dated May 14, 2019, 6 pages.
Japanese Patent Application No. 2017-557147 Office Action dated Feb. 26, 2019, 9 pages.
European Patent Application No. 16 763 691.9 Office Action dated Jan. 23, 2020, 8 pages.
PCT International Search Report and Written Opinion for International Application No. PCT/US2020/023450 dated Jul. 8, 2020, 12 pages.

* cited by examiner

| FILE ID | PORTION ID | START POINT | END POINT | STORED ON LOCAL CACHE? | WHEN LAST MODIFIED? |
|---|---|---|---|---|---|
| 154 | 1 | 0001 | 0050 | Y | 20150102 10:14 |
| 154 | 2 | 0051 | 0100 | Y | 20150102 10:14 |
| 154 | 3 | 0101 | 0150 | Y | 20150102 10:14 |
| 154 | 4 | 0151 | 0200 | Y | 20150102 10:14 |
| 931 | 1 | 0001 | 0100 | N | 20150103 16:59 |
| 931 | 2 | 0101 | 0200 | N | 20150103 17:00 |
| 931 | 3 | 0201 | 0300 | N | 20150103 17:04 |
| 931 | 4 | 0301 | 0400 | N | 20141231 12:01 |
| 931 | 5 | 0401 | 0500 | N | 20141231 12:01 |
| 931 | 6 | 0501 | 0600 | N | 20141231 12:01 |
| 931 | 7 | 0601 | 0700 | N | 20141231 12:01 |
| 1526 | 1 | 0001 | 0025 | Y | 20150102 12:24 |
| 1526 | 2 | 0026 | 0050 | Y | 20150102 12:24 |
| 1526 | 3 | 0051 | 0075 | Y | 20150102 12:25 |
| 287 | 1 | 0001 | 0100 | Y | 20150104 07:56 |
| 287 | 2 | 0101 | 0200 | Y | 20150104 07:56 |
| 287 | 3 | 0201 | 0300 | N | 20141220 21:20 |
| 287 | 4 | 0301 | 0400 | N | 20141220 21:20 |
| 287 | 5 | 0401 | 0500 | N | 20141220 21:20 |
| 423 | 1 | 0001 | 0400 | N | 20150102 10:53 |
| 423 | 2 | 0401 | 0800 | Y | 20150103 09:10 |
| 423 | 3 | 0801 | 1200 | N | 20150102 10:53 |
| 158 | 1 | 0001 | 0300 | Y | 20150103 10:04 |
| 158 | 2 | 0301 | 0600 | N | 20141230 19:21 |

FIG. 2

SYSTEMS AND METHODS FOR CONTENT STORAGE AND RETRIEVAL

FIELD OF THE INVENTION

In general, this disclosure relates to data storage, in particular, to systems and methods for storing data in cloud storage.

BACKGROUND

Web-based storage systems are file hosting systems that allow users to store and retrieve data accessible from one or more user devices. These storage systems may use cloud storage to store user data. It is sometimes desirable for a user device to have access to files that are stored in a web-based storage system. However, if the files are large, it may be undesirable for the user to wait until the entirety of the file is downloaded to the user's device before the user can access the file.

SUMMARY

Systems and methods are disclosed herein for maintaining data storage. One aspect relates to a system or method for accessing portions of a file at a client device. One or more portions of a file are selected for downloading to the client device, wherein the file is stored on a web-based storage system in communication with the client device via a network. At least one portion in the selected one or more portions is identified that is not stored on the client device. A request is transmitted, without user interaction, to the web-based storage system to download the identified at least one portion of the file, and the identified at least one portion of the file is downloaded to the client device via the network.

Another aspect relates to a system including means for accessing portions of a file at a client device. The system includes means for selecting one or more portions of a file for downloading to the client device, wherein the file is stored on a web-based storage system in communication with the client device via a network, means for identifying at least one portion in the selected one or more portions that is not stored on the client device, means for transmitting a request, without user interaction, to the web-based storage system to download the identified at least one portion of the file, and means for downloading the identified at least one portion of the file to the client device via the network.

In some implementations, the means for identifying comprises means for comparing the selected one or more portions to entries in a metafile. Each entry in the metafile includes a portion identifier identifying each of the selected one or more portions, and an indication of whether each of the selected one or more portions is stored on the client device. The metafile may be stored on the client device and is not accessible to a user of the client device. The metafile is updated after the identified at least one portion is downloaded to reflect that the identified at least one portion is stored on the client device.

In some implementations, the file corresponds to a document, and the system includes means for providing a view of a first portion of the document to a user operating the client device, wherein the selected one or more portions of the file includes second and third portions of the document that are adjacent to the first portion. The selected one or more portions of the file may correspond to portions of the file that are assigned priority scores determined based on a historical viewing pattern of the file or editing activity of the file. In some implementations, an application is installed on the client device to display contents of the file on the client device, and the application is not modified to accommodate displaying the selected one or more portions of the file.

In some implementations, the system further comprises means for encrypting the identified at least one portion of the file before the identified at least one portion of the file is stored on the client device. The means for encrypting uses a first key and a first initialization vector, wherein the first key and a second initialization vector different from the first initialization vector are used to encrypt another portion of the file that is stored on the client device. The system may further comprise means for storing the first initialization vector and the second initialization vector in a metafile, wherein each entry in the metafile includes a portion identifier identifying each of the selected one or more portions, and an indication of whether each of the selected one or more portions is stored on the client device.

In some implementations, the system further comprises means for determining a size of the one or more portions of the file based on at least one of a connection speed of the network, a type of the file, and an amount of data within the file predicted to be requested by a user of the client device.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2 is a diagram of a database structure that tracks portions of files and stores an indication of whether each portion is locally cached on a client device, according to an illustrative embodiment.

DETAILED DESCRIPTION

To provide an overall understanding of the disclosure, certain illustrative embodiments will now be described, including a system for providing file content storage and retrieval in a web-based storage system. In particular, a method is described that allows for efficient downloading and usage of data. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for storing and retrieving files from a cloud storage system. The systems and methods described herein overcome many of the technical difficulties associated with existing web-based file upload systems and are described in terms of a web-based storage system, which may communicate with other systems over a network to store and share user data. In general, one of ordinary skill in the art will understand that the systems and methods described herein are applicable to systems that are locally interconnected without departing from the scope thereof.

Figure 1:
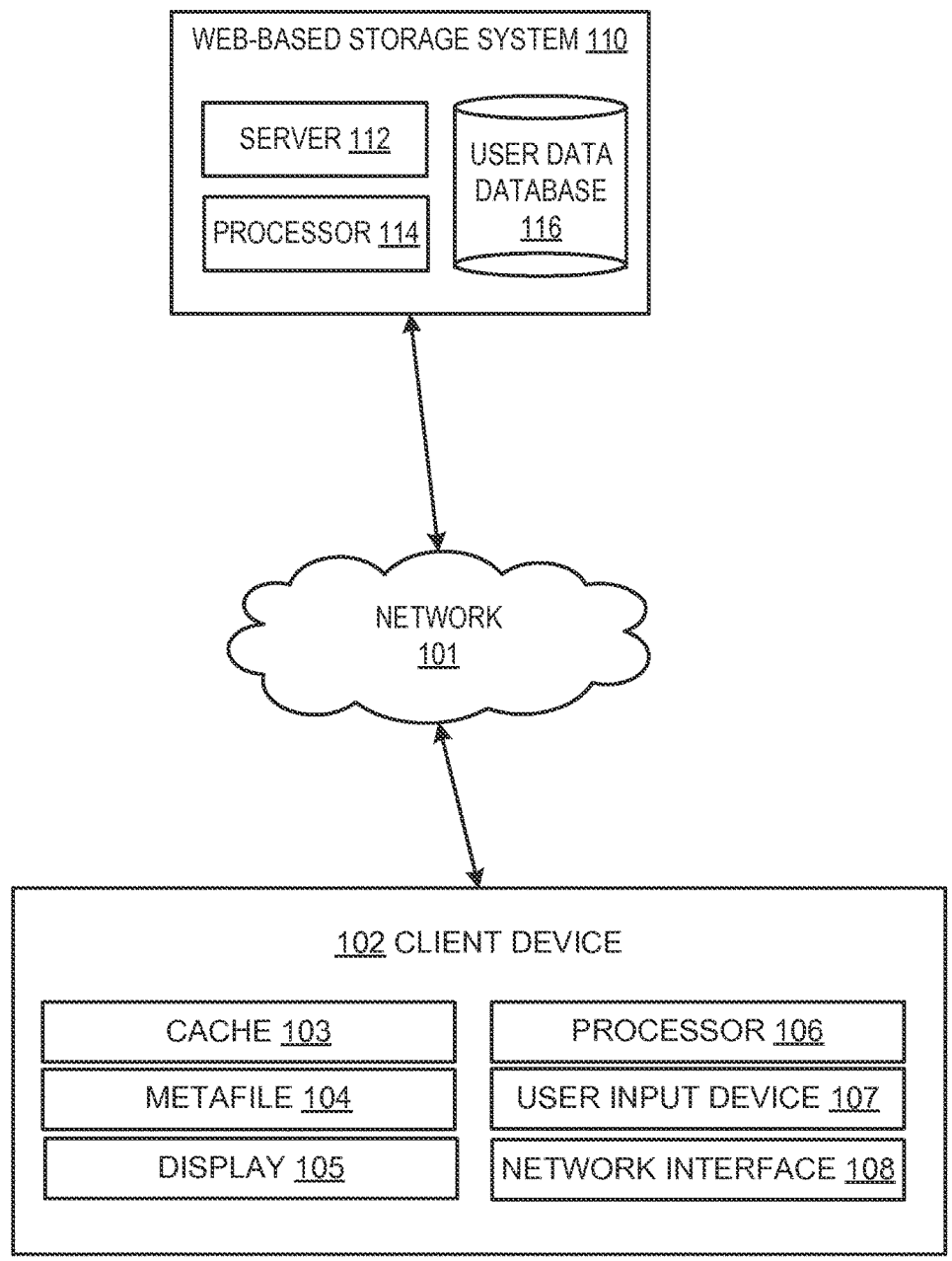
FIG. 1 is a block diagram of a computerized system for accessing portions of a file on a client device, according to an illustrative embodiment.

FIG. 1 depicts an example of a network and database structure that may be used to implement the systems and methods herein. FIG. 1 is a block diagram of a computerized system 100 for allowing data stored on a cloud storage system to a client device. The system 100 includes a web-based storage system 110 and a client device 102, configured to communicate with each other over a network 101. The web-based storage system 110 includes a server 112, a processor 114, and a user data database 116, and the client device 102 includes a cache 103, a metafile 104, a display 105, a processor 106, a user input device 107, and a network interface 108. As used herein, the term "processor" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. Only one web-based storage system 110 and one client device 102 are shown in FIG. 1 to avoid complicating the drawing. In general, the system 100 can support multiple web-based storage systems and any number of client devices 102.

The web-based storage system 110 is a file hosting system that allows users to store, retrieve, and modify data. This data may be referred to as a user's web data, which is stored in the user data database 116. The server 112, the processor 114, or both may perform functions related to maintaining the user data database 116, such as allocating memory for the data, receiving new data to be stored in the database, deleting data in the database, providing indications of how much storage space is available in the database, or any other suitable function related to database maintenance. The web-based storage system 110 may be stored on a single server system or in a distributed system. In particular, the web-based storage system 110 may use cloud storage to store user data.

The files stored on the web-based storage system 110 may be large. For example, the files may include video content, large database structures for record keeping, or any other suitable type of large file. When there is a slow connection to the network 101 (e.g., a slow internet connection), it may take a long time for a file to download. It may be generally undesirable to wait until the large file is downloading before the file is provided to a user operating the client device. In this case, the file may be divided into multiple portions, or chunks, and only the relevant portions may be downloaded to the client device. The portions of the file may include a fixed number of bytes, for example, and may have the same size or be of different sizes.

The client device 102 may request to access a portion of a large file that is stored on the web-based storage system 110. For example, when the file is a video file, it may be undesirable to wait until the entire file is downloaded to the cache 103 on the client device 102 before the video content of the file can be provided to the user. In this case, the video file may be divided into multiple portions, and the relevant portion or portions are downloaded to the client device 102. While some of the examples described herein related to large video files, the present disclosure is not limited to video files, and are also applicable to other types of files, including files that include audio content, text content, image content, database content, or any other suitable type of file content.

As shown in FIG. 1, the client device 102 includes a cache 103, a metafile 104, a display 105, a processor 106, a user input device 107, and a network interface 108. The user input device 107 allows the user to interact with the files. For example, the user input device 107 may include a keyboard, a mouse, or a touch screen, such that the user may provide a user input by selecting a file that is stored on the user data database 116. The user input may indicate a request from the user to read the selected file or to modify the selected file.

The file is stored in cloud storage in the user data database 116, but a portion of the file or the entire file may also be locally stored in the cache 103 on the client device 102. If the file is already stored in the cache 103, then there is no need for the client device 102 to download the file from the web-based storage system 110. In this case, the file may be provided directly to the user by opening an application that provides a view of the contents of the file over the display 105. Otherwise, the client device 102 transmits a request to the web-based storage system 110 to transfer content of the file to the client device 102. In one example, the cache 103 may not store any portion of the file. In this case, the request may include an indication of which portions of the file are requested to be downloaded to the cache 103, or whether the entire file should be downloaded to the cache 103. In another example, the cache 103 may already store a subset of the portions of the file. In this case, if the requested portions are already locally cached, then there may be no need for the client device 102 to download the requested portions. Alternatively, if none of the requested portions are already locally cached, then the web-based storage system 110 may transmit the requested portions to the client device 102.

If some of the requested portions are locally cached, then the web-based storage system 110 may transmit the requested portions that are not already locally cached to the client device 102. For example, the portions that are locally cached may correspond to portions of a video file that have already been viewed and/or cached on the client device 102. It may be desirable for the client device 102 to stream the video file. To facilitate the streaming, the client device 102 may locally store some later portions of the video file that have not yet been viewed, in anticipation that the user may wish to view these later portions of the video file. In this case, the client device 102 may request to download later portions while previously downloaded portions are being played. These requested later portions may then be transmitted to the client device 102 and stored in the cache 103 until ready for viewing.

In the above example, the file is described as including video content. In general, the file may include other content. For example, the file may be a document file that includes text and/or graphical or pictorial content. In this case, the file may be divided into portions that may be ordered sequentially. In an example, the user may view a particular portion of the file over the display 105. The particular portion may be locally stored in the cache 103, but the other portions of the file may be stored in the web-based storage system 110 and not locally cached. As the user views the particular portion of the file over the display 105, the system 100 may identify the preceding portion and the following portion that are adjacent to the particular portion. The preceding portion and/or the following portion may be downloaded to the cache 103 while the particular portion is being viewed, in anticipation that the user may scroll to one of these portions. Similarly, the system 100 may determine that some portions of the file contain content that is more likely to be viewed than other portions of the file, and may assign relative priorities to such portions. For example, textual content may be more likely to be viewed and edited than pictorial content, such that portions including textual content may be prioritized for downloading over portions including pictorial content.

In some embodiments, portions of the file that may be more likely to be viewed (and therefore prioritized) may be identified based on a historical pattern of viewing behavior. In one example, content that has been updated recently or heavily edited since the latest version that the user has viewed may be prioritized over other portions. In another example, if the system 100 detects that the user is scrolling through a document in a particular direction (e.g., from top to bottom or from bottom to top, for example), the portions of the file may be prioritized according to that direction, such that portions predicted to be displayed earlier are downloaded before portions predicted to be displayed at a later time.

In general, the file is not restricted to video files or documents that include textual and/or pictorial content. The file may be any type of file that is suitable for being divided into multiple portions. In some embodiments, the file is a database structure that keeps records of certain data. In an example, the file may be a list of records, such as a list of students enrolled in a school. Each record in the list may include data corresponding to a student, such as the student's name, email address, home address, student identification number, emergency contact information, enrolled classes, transcript, tuition bill status, or any other suitable data relating to a student. In this case, the file may be a large file that is stored on the web-based storage system 110. A user at the client device 102, such as a school administrator, may wish to view only a selected portion of the file, such as a portion of the file that includes a data record associated with a particular student. In this case, rather than downloading the entire file over the network 101, which can take a long time, only the selected portion of the file may be downloaded to the client device 102 from the web-based storage system 110. After the relevant portion is downloaded to the client device 102, the user may make a modification to the selected student's data record on the client device 102, which may then upload the modified portion of the file to the web-based storage system 110. In this case, the file may be divided into portions appropriately sized to store a certain number of records. For example, each portion may correspond to an integer number of students, such as a single student or multiple students.

In some embodiments, the sizes of the portions of the file are selected in an optimal way. In particular, the sizes of the portions should be determined in view of network connection speed and a predicted use application for the file. It may be undesirable to use portions that are sized too large, because large portions take longer to transmit over the network 101 than smaller portions. Moreover, large portions may be undesirable if the amount of content that is actually desired on the client device 102 corresponds to just a small part of a large portion. For example, in the above example in which the file is a database structure that keeps track of students enrolled in a school, it may be undesirable to use portions of the file that are sized to contain a large number of students. In particular, it may be desirable for the user at the client device 102 to view and modify the records corresponding to one student at a time, such that portions that are sized to include single student records may be suitable. It will be understood that the example described herein relating to a file that stores data related to students enrolled at a school is described for illustrative purposes only, and that in general, the systems and methods of the present disclosure are applicable to files that store data related to any type of record keeping data.

It may also be undesirable to have a file divided into a large number of small portions if the portions are so small that any request from the client device 102 to download a portion of the file would involve downloading of multiple portions. In the above-described example, it may be undesirable for portions to be sized to include a fraction of a student record, as any request to view or modify a student's record may require downloading and storing of multiple portions.

Depending on the application, it may be desirable for the user at the client device 102 to view and modify the records corresponding to multiple students at a time. For example, the user may wish to view the records of all students from a particular class or students that satisfy one or more criterion, such as all students in a particular grade, students who are graduating, students involved in a club or organization, students who have an outstanding balance on their tuition bill, or any other suitable category. In this case, portions may be generated in an on-the-fly approach in which the relevant student records (that satisfy the one or more criterion) are bundled into a portion and downloaded to the client device 102. In this case, the portions and their sizes are not predetermined, but are rather determined dynamically as needed.

As described herein, the systems and methods of the present disclosure allow for a user at a client device 102 to view and optionally modify a portion of a file without having to download the file in its entirety to the client device 102. The present disclosure allows a client device 102 to only download relevant portions of the file from the web-based storage system 110, such that the user may view and optionally modify certain portions on an as-needed basis.

In some embodiments, the systems and methods of the present disclosure operate in a manner that is not visible to the user of the client device 102. In particular, the user may not be aware that the client device 102 is communicating with the web-based storage system 110 in the described manner to download portions of a file at a time. Moreover, the software applications executed by the client device 102 to open, display, and modify the various portions of the file may also be unaware that only portions of the file are being cached on the client device 102, instead of the file in its entirety. In contrast to video streaming applications, the application on the client device 102, in accordance with the present disclosure, may not need to be specially equipped to handle opening and viewing portions of a file at a time.

In this case, the systems and methods of the present disclosure operate in the background on the client device 102. In an example, the user is using a software application on the client device 102 to open and scroll through a document that has size 20 megabytes (MB). The document corresponds to a file stored in the web-based storage system that is divided into ten portions, each portion having size 2 MB. While the user scrolls through the first ten MB, the software application may request for the 11$^{th}$ MB through the 15$^{th}$ MB. The client device 105 may query a database structure (such as the database structure shown and described in detail in relation to FIG. 2, for example) to determine that the 11$^{th}$ MB through the 15$^{th}$ MB correspond to portions 6, 7, and 8. Upon mapping the requested megabytes of the document to portions of the file, the client device 102 then transmits a request to the web-based storage system 110 to download portions 6, 7, and 8.

In some embodiments, the portions of the file are encrypted before being stored in the cache 103, and are decrypted before being provided to a user of the client device 102. In an example, the Advanced Encryption Standard (AES) is used to encrypt the portions in the cache 103, though in general any suitable encryption method may be used. It may be desirable to encrypt data that is downloaded from the web-based storage system 110 to the client device 102 at least because doing so may encourage users to store their files in a cloud system, such as the web-based storage system 110. For example, if a user loses his client device 102, another person who accesses the client device 102 may not be able to access the data stored in the cache 103 because the data stored in the cache 103 is encrypted.

The encryption method used to encrypt the portions stored in the cache 103 may involve using a same key for an entire file, but having different initialization vectors for each portion of the file. The different initialization vectors may be stored in the metafile 104, or in a database structure such as the database structure 200 described in relation to FIG. 2. To decrypt the portions of the file, a decryption process may be performed from the beginning of a portion up to the last byte of the portion that is requested to be viewed or modified on the client device 102. As is shown in FIG. 1, the metafile 104 is stored on the client device, but the metafile 104 may be stored on the web-based storage system 110 or any other device that has access to the network 101. In some embodiments, the metafile is not accessible to a user of the client device.

The processor 106 may be configured to perform any of the functions described herein as being performed by the client device 102. In particular, the processor 106 may select one or more portions for downloading to the client device 102, identify at least one portion in the selected one or more portions that is not stored on the client device, transmit a request to the web-based storage system 110 to download the identified portion, and download the identified portion. Moreover, the processor 114 may be configured to perform any of the functions described herein as being performed by the web-based storage system 110. Additionally or alternatively, any of the functions described herein as being performed by the processor 106 may be performed by the processor 114, and vice versa. For example, most of the present disclosure describes the metafile 104 as being stored on the client device 102. Alternatively, the metafile 104 may be stored on the web-based storage without departing from the scope of the present disclosure.

FIG. 2 depicts an exemplary database structure 200 that keeps track of portions of a set of files, such as a set of files associated with one or more users of the client device 102. The data structure 200 may correspond to data that is stored in the metafile 104 shown and described in relation to FIG. 1. The data shown in the database structure 200 may be stored in the metafile 104 locally on the client device 102, in the web-based storage system 110, or in another system that has access to the network 101. The database structure 200 shown in FIG. 2 is essentially a map that may be used identify the portions and their locations within the file. In particular, each entry in the database structure 200 is depicted in a row of the database structure 200 and corresponds to a portion of a file. Each entry includes a file identifier, a portion identifier, a start point, an end point, a flag indicator that indicates whether the portion is stored on a local cache, such as the cache 103 on the client device 102, and a time stamp corresponding to when the portion was last modified. Each start point and end point pair indicates the locations within the file of the starting boundary and the ending boundary, respectively, of a portion in within the file.

As is shown in FIG. 2, the file identified by file identifier 154 is divided into four portions, with portion identifiers 1, 2, 3, and 4. Each portion of the file 154 has the same size of 50 units of data, where each unit may refer to a number of data bits or bytes. Moreover, each of the four portions of the file 154 is stored locally on the cache 103. Because each portion of the file 154 is stored in the cache 103, if the user wishes to access any portion of the file 154 via the client device 102, the system 100 uses the data structure 200 to determine that all portions of the file 154 are already stored on the cache 103, and no portions need to be transmitted over the network 101.

As another example, the data structure 200 shows a file 931 divided into seven portions, each portion having size 100 units of data. In contrast to the file 154, none of the portions of the file 931 are stored locally on the cache 103. In this case, when the client device 102 identifies a request to access the file 931 (or a portion thereof), the system 100 uses the data structure 200 to determine that none of the portions of the file 931 are locally stored on the client device 102. In response to this determination, the web-based storage system 100 transmits the desired portions over the network 101 to the client device 102 for providing to the user.

As another example, the data structure 200 shows a file 287 divided into five portions, each having size 100 units of data. Two of these five portions (portions 1 and 2) are stored locally in the cache 103, while the remaining three portions (portions 3, 4, and 5) of the file 287 are not stored in the cache 103. In this case, if one of the portions 1 or 2 are requested by the client device 102, then it is not necessary for the web-based storage system 100 to transmit these portions over the network 101 to the client device 102 because these portions are already locally cached. In contrast, if one of the portions 3, 4, or 5 are requested by the client device 102, then the web-based storage system 100 transmits the requested one or more portions to the client device 102.

As is shown in FIG. 2, the portions of the various files do not overlap with one another. However, it will be understood that the portions may overlap with one another without departing from the scope of the present disclosure. Moreover, the data structure 200 depicts files in which each file is divided into equally-sized portions, though the sizes of the portions may be different for different files. In general, the portions may all be the same size for different files, or differently sized portions may be used for the same file. In some embodiments, when the portions are the same size, the map may include the start points without the end points, the end points without the start points, or another point such as the center point of the portion.

The entries shown in the database structure 200 are depicted for illustrative purposes only, and the entries in the map described herein may include a subset of the shown fields, and/or may include other fields that are not shown, such as a timestamp corresponding to when the file (or the portion) was created or last accessed, a type of the file or the content of the file portion, and a number of portions for a file.

As is shown in FIG. 2, the portions of the file have fixed sizes for a certain file, and different files may have differently sized file portions. In general, the sizes of the file portions may be the same or different across different files and even within the same file. In particular, the size of a file portion may be determined dynamically, in response to a detection of a connection speed over the network 101. For example, the sizes of the portions may be dynamically determined based on an internet connection speed. In particular, when the internet connection speed is slow, the portion size may be smaller than when the internet connection speed is fast.

As portions are downloaded to the client device 102 or are deleted from the client device 102, the metafile 104 is updated to reflect which portions are stored in the cache 103. In particular, the database structure 200 is updated to keep an accurate record of which portions are cached on the client device 102 and which portions are not cached.

Figure 3:
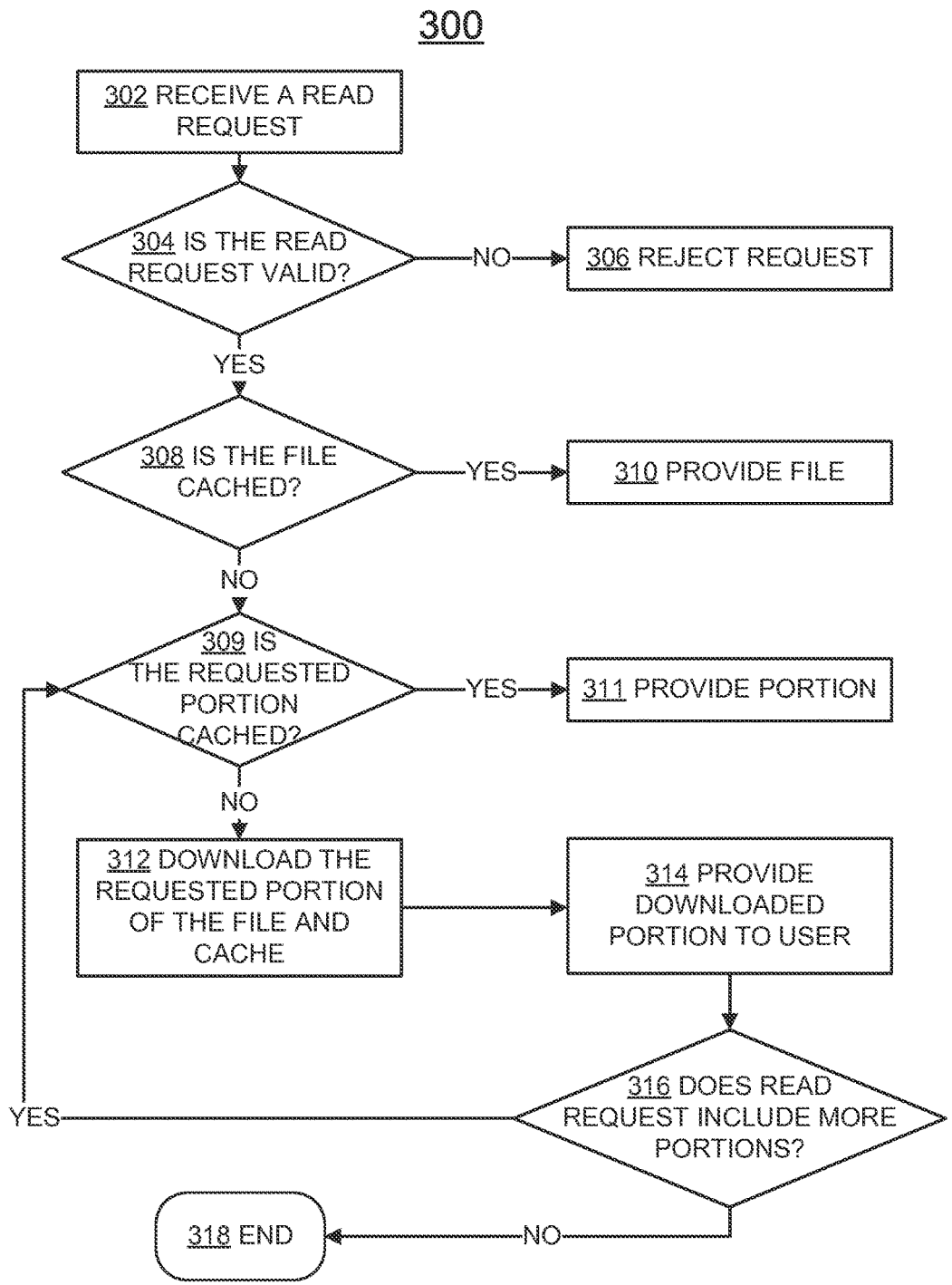
FIG. 3 is a flow chart of an illustrative method for providing one or more portions of a file in response to a read request, according to an illustrative embodiment.

FIG. 3 is a flow chart of an illustrative method 300 for providing a portion of a file in response to a read request from the client device 102. The method 300 includes the steps of receiving a read request (step 302), determining whether the read request is valid (decision block 304), and determining whether the file within the read request is cached (decision block 308). In one example, a read request may be determined to be not valid if the request includes an incorrect offset, such as a request for data that occurs before the start or after the end of a file. In additional examples, a read request may not be valid if it requests data from a file that no longer exists or has been deleted, if the client device 102 does not has permission to read from the requested file, if the request is for data from a folder instead of a particular file, if the read request fails to provide a location to put the read data, or any suitable combination thereof. If the read request is not valid, the request is rejected at step 306. If the file is cached, such as being locally stored on the cache 103, then the file is provided to the user via the client device 102 at step 310. Otherwise, if the file is not cached, then the method determines whether the requested portion of the file is cached at decision block 309. If so, the requested portion of the file is downloaded and cached at step 312, and the downloaded portion is provided to the user at step 314. At decision block 316, the read request is examined to determine if there are any more portions that have not yet been downloaded or provided to the user. Steps 309, 311, 312, and 314 are repeated until all portions within the read request are downloaded and provided to the user.

At decision block 308, the determination of whether the file is cached may involve identifying any portions within the request. In an example, the request may refer to a part of the file denoted by size, such as the 11$^{th}$ MB through the 15$^{th}$ MB of a 20 MB file. Then, the system 100 may use a database structure such as the database structure 200 as a map to identify appropriate portion identifiers corresponding to the part in the request. In another example, the request may already refer to the appropriate portion identifiers. The system 100 may determine whether any of the portions in the request are cached on the client device 102 at decision block 309. Any portions that are already cached may be provided at step 311, while any portions that are not cached may be downloaded at step 312 and provided to the user at step 314.

Figure 4:
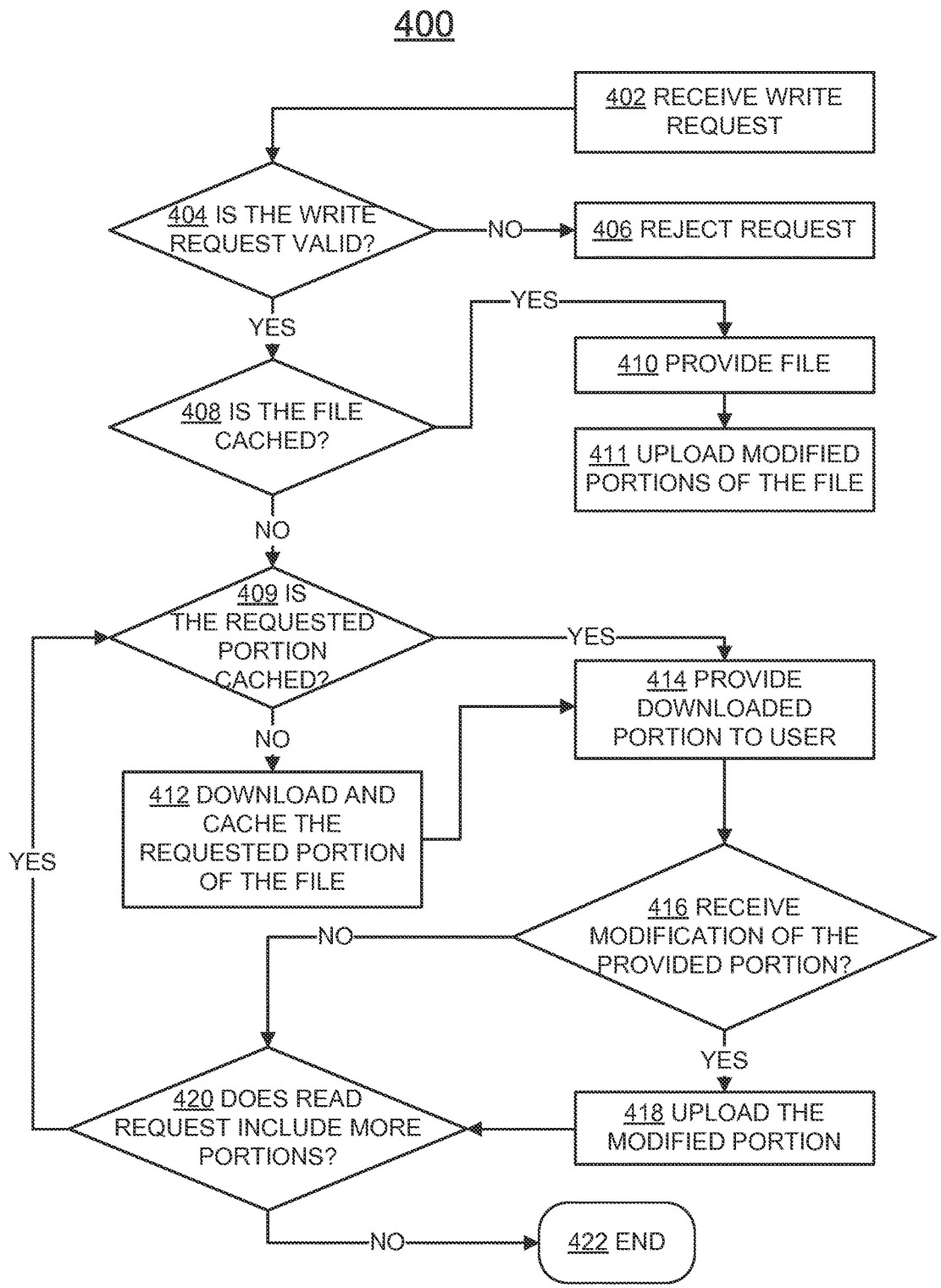
FIG. 4 is a flow chart of an illustrative method for providing one or more portions of a file in response to a write request, according to an illustrative embodiment.

FIG. 4 is a flow chart of an illustrative method 400 for providing a portion of a file in response to a write request from the client device 102. The method 400 includes the steps of receiving a write request (step 402), determining whether the write request is valid (decision block 404), and determining whether the file within the write request is cached (decision block 408). A write request may be not valid for any of the same reasons that a read request may not be valid, as described above in relation to FIG. 3. Moreover, a write request may be invalid if it is larger than a predetermined limit. If the write request is not valid, the request is rejected at step 406. If the file is cached, such as being locally stored on the cache 103, then the file is provided to the user via the client device 102 at step 410, and modified portions of the file are uploaded to the web-based storage system 110 at step 411. Otherwise, if the file is not cached, then the method determines whether the requested portion of the file is cached at decision block 409. If not, the requested portion of the file is downloaded and cached at step 412, and the downloaded portion is provided to the user at step 414. Otherwise, if the requested portion of the file is already cached as determined at decision block 409, the method 400 proceeds directly to step 414 to provide the downloaded portion to the user. At decision block 416, it is determined whether the user made a modification to the provided portion. If so, then the modified portion is uploaded at step 418. Otherwise, the read request is examined to determine if there are any more portions that have not yet been downloaded or provided to the user at decision block 420. Steps 409, 412, 414, 416, and 418 are repeated until all portions within the write request are downloaded and provided to the user.

Figure 5:
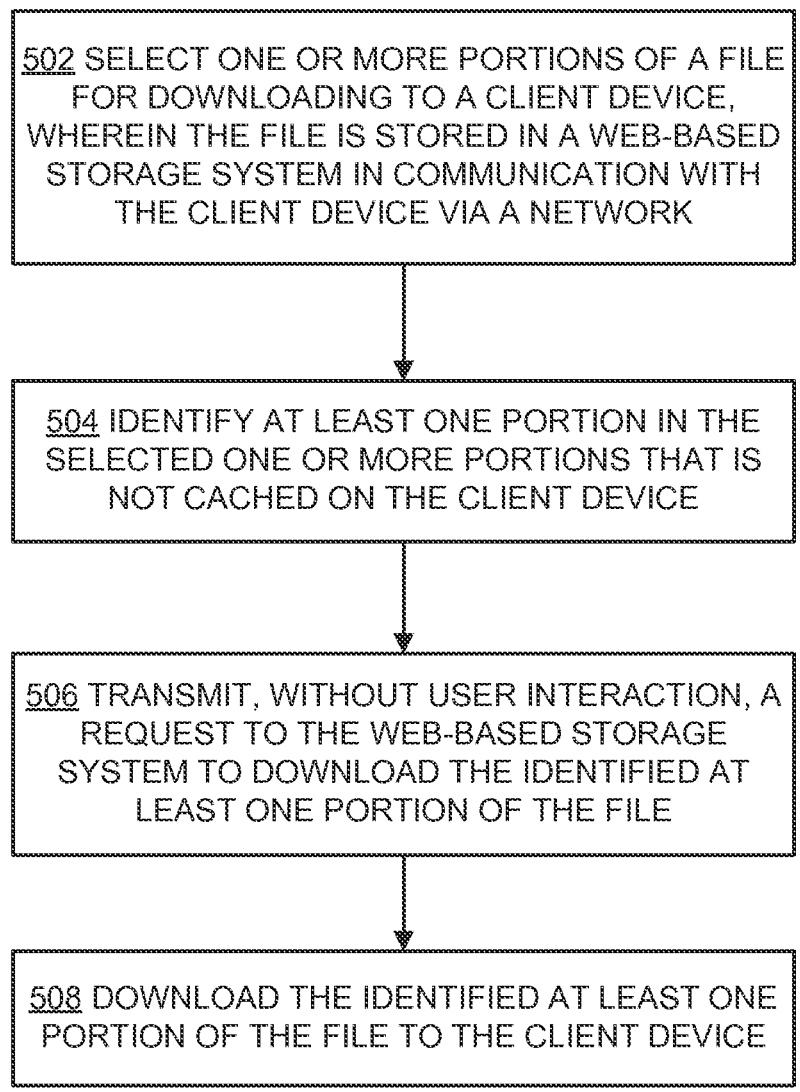
FIG. 5 is a flow chart of an illustrative method for accessing portions of a file on a client device, according to an illustrative embodiment.

FIG. 5 is a flow chart of an illustrative method 500 for accessing portions of a file at a client device. The method 500 includes the steps of selecting one or more portions of a file for downloading to the client device, wherein the file is stored on a web-based storage system in communication with the client device via a network (step 502), identifying at least one portion in the selected one or more portions that is not stored on the client device (step 504), transmitting, without user interaction, a request to the web-based storage system to download the identified at least one portion of the file (step 506), and downloading the identified at least one portion of the file to the client device via the network (step 508).

At step 502, one or more portions of a file are selected for downloading to the client device, wherein the file is stored on a web-based storage system in communication with the client device via a network. In some embodiments, when the file corresponds to a document, a first portion of the document may be provided over the display 105 to a user operating the client device 102. The selected one or more portions of the file may correspond to second and third portions of the document that are adjacent to the first portion. Additionally or alternatively, the selected one or more portions of the file may be determined based on a historical viewing pattern of the file. For example, if the user is scrolling in a direction from top to bottom of the document, then the selected one or more portions of the file may include those portions that are predicted to be viewed next. Moreover, the portions may be assigned priority scores that are determined based on the direction of the scrolling. For example, portions that occur above other portions in the document may be assigned a higher priority score than the lower portions, and portions with higher priority scores may be downloaded before other portions. Additionally or alternatively, the selected one or more portions of the file may be determined based on a determined editing activity of the file. For example, a portion of the file that has not yet been viewed by the user but has been heavily edited by one or more other users may be prioritized before other portions that have been less edited.

In some embodiments, the size of the one or more portions of the file is determined based on at least one of a connection speed of the network, a type of the file, and an amount of data within the file predicted to be requested by a user of the client device. As is described in relation to FIG. 1, a slower connection speed may be associated with smaller portions than when the connection speed of the network 101 is fast. Moreover, when the file includes a database that tracks records, such as students enrolled in a school, the file may be divided into portions appropriately sized for the particular application. For example, the portions may be sized to include a record for a single student.

At step 504, at least one portion in the selected one or more portions is identified that is not stored on the client device. For example, the one or more portions selected at step 502 may be compared to entries in a metafile, such as the database structure 200 shown and described in relation to FIG. 2. In particular, each entry in the metafile may include a reference to a portion identifier that identifies each of the selected one or more portions. Each entry in the metafile may further include an indication of whether each of the selected one or more portions is stored on the client device.

At step 506, a request is transmitted, without user interaction, to the web-based storage system to download the identified at least one portion of the file. In some embodiments, an application is installed on the client device to display contents of the file on the client device, and the application is not modified to accommodate displaying the selected one or more portions of the file. In particular, the application used to open the file, if the file was locally cached in its entirety, is the same application that can be used to open the file portions, and no changes need to be made to the application to enable it to open portions of a file. In general, the systems and methods of the present disclosure may be implemented on a user's client device without any need to change the user's normal interaction with the client device, regardless of whether the relevant portion of the file is initially cached or not.

At step 508, the identified at least one portion of the file is downloaded to the client device via the network. In particular, the identified at least one portion is transmitted by the web-based storage system 110 to the client device 102. Before the transmitted portion is stored on the client device 102, the transmitted portion may be encrypted. As is described above, the encryption method may include using a same key and a different initialization vector as are used for other portions of the same file. Moreover, the different initialization vectors may be stored in the metafile 104, or as a field entry in the database structure 200.

Figure 6:
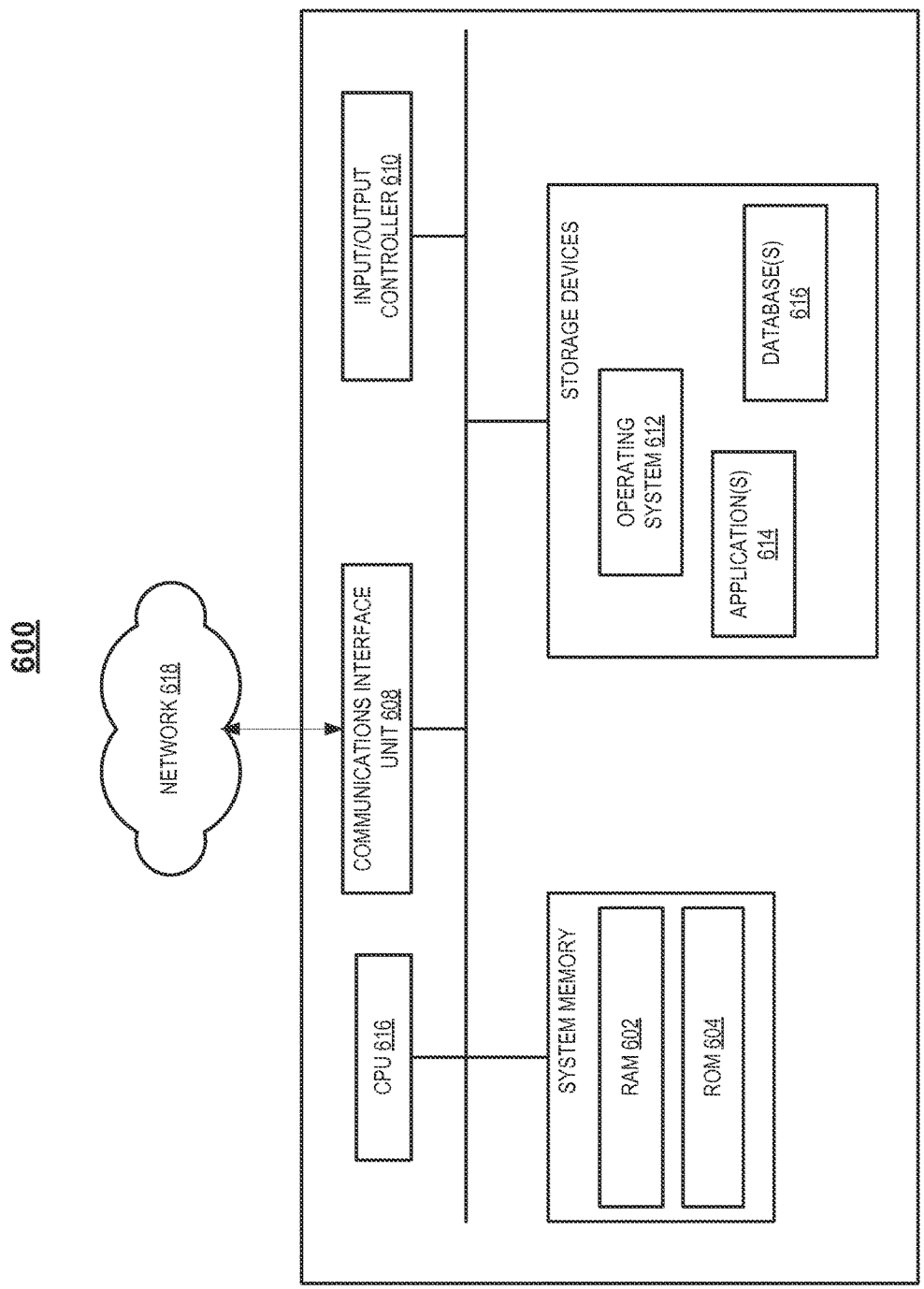
FIG. 6 is a block diagram of a computing device for performing any of the processes described herein, according to an illustrative embodiment.

FIG. 6 is a block diagram of a computing device, such as any of the components of the system of FIG. 1, for performing any of the processes described herein. Each of the components of these systems may be implemented on one or more computing devices 600. In certain aspects, a plurality of the components of these systems may be included within one computing device 600. In certain implementations, a component and a storage device may be implemented across several computing devices 600.

The computing device 600 comprises at least one communications interface unit, an input/output controller 610, system memory, and one or more data storage devices. The system memory includes at least one random access memory (RAM 602) and at least one read-only memory (ROM 1004). All of these elements are in communication with a central processing unit (CPU 606) to facilitate the operation of the computing device 600. The computing device 600 may be configured in many different ways. For example, the computing device 600 may be a conventional standalone computer or alternatively, the functions of computing device 600 may be distributed across multiple computer systems and architectures. In FIG. 6, the computing device 600 is linked, via network or local network, to other servers or systems.

The computing device 600 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 608 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 606 comprises a processor, such as one or more conventional microprocessors and one or more supplementary co-processors such as math co-processors for offloading workload from the CPU 606. The CPU 606 is in communication with the communications interface unit 608 and the input/output controller 610, through which the CPU 606 communicates with other devices such as other servers, user terminals, or devices. The communications interface unit 608 and the input/output controller 610 may include multiple communication channels for simultaneous communication with, for example, other processors, servers or client terminals.

The CPU 606 is also in communication with the data storage device. The data storage device may comprise an appropriate combination of magnetic, optical or semiconductor memory, and may include, for example, RAM 602, ROM 604, flash drive, an optical disc such as a compact disc or a hard disk or drive. The CPU 606 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 606 may be connected to the data storage device via the communications interface unit 608. The CPU 606 may be configured to perform one or more particular processing functions.

The data storage device may store, for example, (i) an operating system 612 for the computing device 600; (ii) one or more applications 614 (e.g., computer program code or a computer program product) adapted to direct the CPU 606 in accordance with the systems and methods described here, and particularly in accordance with the processes described in detail with regard to the CPU 606; or (iii) database(s) 616 adapted to store information that may be utilized to store information required by the program.

The operating system 612 and applications 614 may be stored, for example, in a compressed, an uncompiled and an encrypted format, and may include computer program code. The instructions of the program may be read into a main memory of the processor from a computer-readable medium other than the data storage device, such as from the ROM 604 or from the RAM 602. While execution of sequences of instructions in the program causes the CPU 606 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to any of the processes as described herein. The program also may include program elements such as an operating system 612, a database management system and "device drivers" that allow the processor to interface with computer peripheral devices (e.g., a video display, a keyboard, a computer mouse, etc.) via the input/output controller 610.

The term "computer-readable medium" as used herein refers to any non-transitory medium that provides or participates in providing instructions to the processor of the computing device 600 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 606 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 600 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method comprising:
    receiving, by at least one computer processor for a web-based storage system, a request to access a file at a client device, wherein the file is stored at the web-based storage system in communication with the client device via a network, and wherein the request comprises an application for the file;
    determining, by the at least one computer processor, a size of one or more portions of the file for downloading to the client device, wherein the size of the one or more portions of the file is determined based on at least the application for the file and an amount of data within the file predicted to be requested by a user of the client device;
    selecting, by the at least one computer processor, one or more portions of the file for downloading to the client device wherein the one or more portions of the file are selected based on at least a determination of whether the one or more portions of the file comprise a larger number of edits than other portions of the file that comprise edits, and a type of content detected within the one or more portions of the file;
    accessing, by the at least one computer processor, a metafile stored on the client device to identify at least one portion in the selected one or more portions that is not stored on the client device; and
    responsive to identifying the at least one portion in the selected one or more portions that is not stored on the client device, downloading, by the at least one computer processor, the identified at least one portion of the file to the client device from the web-based storage system via the network.

2. The method of claim 1, wherein accessing the metafile stored on the client device comprises comparing the selected one or more portions to entries in the metafile, and wherein each entry in the metafile includes a portion identifier identifying each of the selected one or more portions, and an indication of whether each of the selected one or more portions is stored on the client device.

3. The method of claim 1, wherein the metafile that is stored on the client device is not accessible to a user of the client device.

4. The method of claim 1, further comprising updating the metafile stored on the client device after the identified at least one portion is downloaded to reflect that the identified at least one portion is currently stored on the client device.

5. The method of claim 1, wherein the file corresponds to a document, the method further comprising providing a view of a first portion of the document to a user operating the client device, wherein the selected one or more portions of the file includes second and third portions of the document that are adjacent to the first portion.

6. The method of claim 1, wherein the selected one or more portions of the file correspond to portions of the file that are assigned priority scores determined based on a historical viewing pattern of the file or editing activity of the file.

7. The method of claim 1, wherein an application is installed on the client device to display contents of the file on the client device, and the application is not modified to accommodate displaying the selected one or more portions of the file.

8. The method of claim 1, further comprising encrypting the identified at least one portion of the file before the identified at least one portion of the file is stored on the client device, wherein the encrypting comprises using a first key and a first initialization vector, and the first key and a second initialization vector different from the first initialization vector are used to encrypt another portion of the file that is stored on the client device.

9. The method of claim 8, further comprising storing the first initialization vector and the second initialization vector in a metafile, wherein each entry in the metafile includes a portion identifier identifying each of the selected one or more portions, and an indication of whether each of the selected one or more portions is stored on the client device.

10. The method of claim 1, wherein the size of the one or more portions of the file is further determined based on at least one of a connection speed of the network, or a type of the file.

11. The method of claim 1, wherein the type of content detected within the portions of the file comprises at least one of a textual content and a pictorial content.

12. A system comprising at least one computer processor for a web-based storage system, the at least one computer processor configured to:
receive a request to access a file at a client device, wherein the file is stored at the web-based storage system in communication with the client device via a network, and wherein the request comprises an application for the file;
determining a size of one or more portions of the file for downloading to the client device, wherein the size of the one or more portions of the file is determined based on at least the application for the file and an amount of data within the file predicted to be requested by a user of the client device;
select one or more portions of the file for downloading to the client device, wherein the one or more portions of the file are selected based on at least a determination of whether the one or more portions of the file comprise a larger number of edits than other portions of the file that comprise edits, and a type of content detected within the one or more portions of the file;
access a metafile stored on the client device to identify at least one portion in the selected one or more portions that is not stored on the client device; and
responsive to identifying the at least one portion in the selected one or more portions that is not stored on the client device, download the identified at least one portion of the file to the client device from the web-based storage system via the network.

13. The system of claim 12, wherein the at least one computer processor accesses the metafile stored on the client device by comparing the selected one or more portions to entries in the metafile, wherein each entry in the metafile includes a portion identifier identifying each of the selected one or more portions, and an indication of whether each of the selected one or more portions is stored on the client device.

14. The system of claim 12, wherein the metafile that is stored on the client device is not accessible to a user of the client device.

15. The system of claim 12, wherein the at least one computer processor is further configured to update the metafile stored on the client device after the identified at least one portion is downloaded to reflect that the identified at least one portion is currently stored on the client device.

16. The system of claim 12, wherein the file corresponds to a document, and the at least one computer processor is further configured to provide a view of a first portion of the document to a user operating the client device, wherein the selected one or more portions of the file includes second and third portions of the document that are adjacent to the first portion.

17. The system of claim 12, wherein the selected one or more portions of the file correspond to portions of the file that are assigned priority scores determined based on a historical viewing pattern of the file or editing activity of the file.

18. The system of claim 12, wherein an application is installed on the client device to display contents of the file on the client device, and the application is not modified to accommodate displaying the selected one or more portions of the file.

19. The system of claim 12, wherein the at least one computer processor is further configured to encrypt the identified at least one portion of the file before the identified at least one portion of the file is stored on the client device, by using a first key and a first initialization vector, and wherein the first key and a second initialization vector different from the first initialization vector are used to encrypt another portion of the file that is stored on the client device.

20. The system of claim 19, wherein the at least one computer processor is further configured to store the first initialization vector and the second initialization vector in a metafile, wherein each entry in the metafile includes a portion identifier identifying each of the selected one or more portions, and an indication of whether each of the selected one or more portions is stored on the client device.

21. The system of claim 12, wherein the size of the one or more portions of the file is further determined based on at least one of a connection speed of the network, or a type of the file.

22. The system of claim 12, wherein the type of content detected within the portions of the file comprises at least one of a textual content and a pictorial content.

23. A non-transitory computer-readable medium comprising instructions, which when executed by at least one computer processor for a web-based storage system, cause the at least one computer processor to perform operations for accessing portions of a file at a client device, the operations comprising:
receiving a request to access a file at a client device, wherein the file is stored at the web-based storage system in communication with the client device via a network, and wherein the request comprises an application for the file;
determining a size of one or more portions of the file for downloading to the client device, wherein the size of the one or more portions of the file is determined based on at least the application for the file and an amount of data within the file predicted to be requested by a user of the client device;
selecting one or more portions of the file for downloading to the client device, wherein the one or more portions of the file are selected based on at least a determination of whether the one or more portions of the file comprise a larger number of edits than other portions of the file that comprise edits, and a type of content detected within the one or more portions of the file;
accessing a metafile stored on the client device to identify at least one portion in the selected one or more portions that is not stored on the client device; and responsive to identifying the at least one portion in the selected one or more portions that is not stored on the client device, downloading the identified at least one portion of the file to the client device from the web-based storage system via the network.

* * * * *